United States Patent Office 3,649,713
Patented Mar. 14, 1972

3,649,713
ELECTROLESSLY PLATEABLE POLYMERIC COMPOSITION

James Chin, Naugatuck, and James C. Hartley, Jr., Middlebury, Conn., assignors to Uniroyal, Inc., New York, N.Y.

No Drawing. Filed Aug. 23, 1968, Ser. No. 754,949
Int. Cl. C08f *19/18, 41/12;* C23c *3/02*
U.S. Cl. 260—876 R 2 Claims

ABSTRACT OF THE DISCLOSURE

The present invention relates to the use of vinylpyridine, which acts as an electroless metal depositing aid, as one constituent of an interpolymer. Such interpolymer is capable of being formed into a plastic article, the surfaces of which, as a result of the vinylpyridine unit contained therein, are suitable for electroless plating.

The present invention relates to the use of vinylpyridine which is an electroless metal depositing aid, as one constituent of an interpolymer. Such interpolymer is capable of being formed into a plastic article, the surfaces of which, as a result of the vinylpyridine monomeric unit contained therein, are suitable for electroless plating.

For the purpose of discussion in the present invention, a distinction is made between the terms "polymeric matrix" and "plastic" which are sometimes used in industry in overlapping senses. In the present invention, "polymeric matrix" refers to the more or less chemically homogeneous polymers or polymer blends used as starting materials in the production of molded articles, while "plastic" signifies the final solid product, which may contain fillers, plasticizers, stabilizers, pigments, etc.

The present invention relates to only a portion of the overall process which is used to deposit metals on plastics by specialized electroplating procedures. Since the electroplating process requires an electrically conductive surface upon which the metal to be plated is deposited, and since plastics are non-conductors, it is first necessary to render the plastic substrate surface conductive, for the final electroplating steps. The pre-plating steps may include first, a conditioning step, wherein the surface of the plastic to be plated is etched in an acid bath to promote the formation of a bond between the plastic substrate and the subsequent electroless plate. The conditioned surface is then made catalytic by a second step known as "activating." "Activating" consists of rendering the surface of the plastic catalytic by absorption of a catalyst thereon, so that a firmly adherent metallic layer can be deposited in the electroless plating step. It has been determined that the best catalysts for this purpose are such precious metals as gold, silver and/or palladium.

In addition, a sensitizing step may be utilized either before or after the activating step if desired. This sensitizing (also known as accelerating) step consists of immersing the plastic into a solution of tin, titanium or some other reducing agent, and results in the formation of free metal on the surface of said plastic. In the electroless plating step, the plastic surface which contains a precious metal, for example palladium or palladium chloride is immersed into an electroless copper or nickel plating bath. In the electroless bath an auto-catalytic chemical reduction occurs. The catalytic action of the precious metal such as palladium or paladium chloride reduces the plating metal, i.e., copper or nickel out of the solution so that it is deposited onto the surface of the plastic. The precious metal nuclei absorbed on the surface of the plastic are covered and the electroless plating continues until the desired thickness is achieved, i.e., somewhere between about ten (10) and forty (40) millionths of an inch. The electroless plating step results in a plastic surface containing the thin film of electrolessly deposited metal which can be electroplated using any standard electroplating procedure.

The only significant limitation imposed on the pretreating or electroplating operations using a plastic substrate is that the temperatures used in each cycle of the pretreating or plating procedure should be no higher than the melt or flow temperatures of the plastic.

Successful electroplating of plastics depends to a large extent upon the pre-plating steps. It is commercially desirable to be able to electroplate a pretreated plastic article and it is equally desirable to obtain as strong a bond as possible between the plastic surface and the electroless metal deposited thereon. It is also desirable to improve the ease of processing the plastic through any or all of preplating steps listed above.

The present invention provides a means of obtaining excellent bond strength between the electrolessly deposited metal and plastic substrate; higher adhesion of such metal to plastic under sometimes adverse processing conditions; and good plateability of the electrolessly deposited metal to the plastic substrate. The incorporation of the depositing aid results in better electroless metal coverage of the plastic under a wider range of processing conditions, i.e., less critical time, temperature, concentrations of solutions, faster cycles, etc. in the preplating steps.

The aforesaid advantages are achieved by incorporating an electroless metal depositing aid, which is a vinylpyridine monomer into an interpolymer which can be formed into a plastic article suitable for electroplating. More specifically, the product of the present invention is a plastic product having enhanced electroless platability resulting from polymerizing an electroless metal depositing aid such as a vinylpyridine monomer with styrene and acrylonitrile to form a terpolymer resin or grafting said vinylpyridine, acrylonitrile, styrene monomers onto an elastomeric spine such as polybutadiene, polybutadiene-styrene, or ethylene-propylene-dicyclopentadiene. If desired, both the terpolymer resin and the graft polymer may be blended at any ratio of the two polymers, depending upon the properties desired, to form an intimate physical mixture of the two polymers (known as a polyblend); or the resin and/or graft polymer may be blended with up to 45% of any of the commercially available resinous acrylonitrile-butadiene-styrene (ABS) plastics. Typical examples of resinous ABS polymers and methods for making same are found in United States Pats. 2,439,202; 2,600,024; 2,820,773; 3,238,275; as well as in ABS Plastics, Rheinhold Publishing Corp., 1964 (pps. 69–75), the disclosures of which are incorporated by reference herein. It has been determined that the terpolymer resin or graft should contain between 0.065% and 2.75% nitrogen atoms (based on the weight of the polymer) which are supplied by the vinylpyridine. The advantage in having the vinylpyridine as an integral part of the terpolymer resin or graft polymer which in some instances is blended with ABS is that the desirable engineering properties of the ABS plastic or rubber are maintained while in addition, the ease in depositing the conductive electroless metal is materially enhanced.

Various patents dealing with electroless chemical metal plating with nickel or copper teach the effect which modifying various solutions in the preplating steps has on the surface of the non-conductive plastic; however such patents do not disclose an alteration of the polymeric substrate prior to processing the plastic through the necessary preplating solutions and steps.

The preferred polymers used in the present invention are made by polymerization of any vinylpyridine monomer with acrylonitrile, and styrene, to form a resin, or a rubber graft polymer which is made from said monomers grafted onto a rubber spine. Where the graft polymer is used, the rubber onto which the acrylonitrile-styrene-vinylpyridine monomers are grafted may consist of either polybutadiene or poly(cobutadiene-styrene) containing less than 40% styrene.

In the terpolymer resin the acrylonitrile component may constitute 5 to 35%, preferably 20 to 35%, and the styrene component may constitute 90 to 65% of the total weight of the polymer with 80 to 65% being the preferred range, and the electroless metal depositing aid component which is vinyl pyridine may constitute .25 to 25% of the total weight of the polymer with 1 to 10% being the preferred range. In the graft polymer, the acrylonitrile component may constitute 3 to 34% of the total polymer weight with 8 to 30% being the preferred range; the styrene component may constitute 7% to 80% of the total weight of the polymer with 20 to 60% being the preferred range; the electroless metal depositing aid component which is as vinylpyridine (preferably 2-vinylpyridine) may constitute between about 0.25% and 25% of the total weight of the polymer with 1 to 10% being the preferred range.

The rubber spine on which the aforesaid monomers are grafted (i.e. polybutadiene or poly(co-butadienestyrene) or ethylene-propylene-dicyclopentadiene) may contain from 10 to 90% by weight of the total graft polymer, with the preferred range being 15 to 75%.

The styrene mentioned as one constituent of the resin includes methyl styrene, and other similar styrene derivatives may also be used as a substitute for all or part of unsubstituted styrene.

The polymers described herein are preferably made using an emulsion polymerization system, but also may be made using other free radical polymerization processes such as: mass, (when the vinyl pyridine content is greater than 10%) bead and solution polymerization. The latices of resin and rubber can be converted to a solid powder polymer by the conventional process of latex blending and flocculation, filtering and drying. The latices can be blended by stirring together the resin polymer and graft polymer with commercial antioxidants for the rubber such as trisnonylphenyl phosphite as described in U.S. Pat. 2,733,226 or a mixture of bisphenol sufficient to give 1% of the rubber weight. In order to flocculate the polymers the mixed latices then can be added to a stirred solution of from 1 to 10% $CaCl_2$ (salt) or acetic acid (acid) in water at from 170° to 200° F. The resulting slurry of flocculated resin and/or rubber is cooled to room temperature and filtered. The filtered polymer then can be dried until the moisture content is below about 1%. The filtered polymer then can be mixed and melted by standard techniques of milling or internal mixing with pigments, lubricants and additives to form the desired plastic.

The plastic can be banded on a rubber mill at roll temperature of 275–360° F. (preferably 300–330° F.) and mixed for 5 minutes. The plastic material removed from the mill can then be compression molded at about 360° F. or injection molded with stock temperatures of between 375 and 535° F. (preferred 410–500° F.), or such material can be extruded at stock temperatures of between 360 and 520° F. (preferred at 410–480° F.).

The plastic articles made according to the present invention can be tested for electroless plating improvement over existing ABS plastics by preparing the samples according to any of the above described polymerization and blending methods.

By polymerizing between about .25% and 25% of such monomeric electroless metal depositing aid with the other aforementioned monomers improvements in the electroless metal depositing rate and uniformity of coverage are obtained when the samples are placed in solutions of either chemical nickel or chemical copper (i.e. solutions containing nickel or copper ions) with the greatest improvement occurring when chemical nickel solutions are used.

Plateability of the polymer, which contains the vinylpyridine electroless metal depositing aid therein as a constituent, is observed even when the specific gravity of the etchant used in a pretreatment step is below the levels recommended in the standard etching procedures, and is also observed when the metal ion in solution to be plated onto said plastic is below the levels recommended for the standard plating solutions used in industry.

It has further been determined that when the polymer containing the vinylpyridine electroless metal depositing aid in the amount defined above is used and is electrolessly plated prior to electroplating, the bond strength between the electroplated metal and plastic is increased as compared with ABS. This bond strength is measured by measuring the force required to separate a metal strip from the surface of the plastic in accordance with the Jacquet Test as disclosed in Bickerman, Science of Adhesion Joint, Academic Press, 7961, p. 183.

The sample polymers used in the examples listed hereinafter were prepared and blended using any one of the methods generally described above and the plastics made therefrom were tested to determine plating improvement over existing ABS plastics. The following examples are presented by way of illustration.

EXAMPLE 1

The following illustrates a resin polymerization to obtain a 64.5/4/31.5 ratio of styrene/vinylpyridine/acrylonitrile. The polymerization reaction was conducted at 150° F., and the conversion was 97–99% three hours after monomer feed out.

| Material: | Parts by weight |
|---|---|
| Water | 120 |
| Styrene | 64.5 |
| 2-vinylpyridine | 4.0 |
| Acrylonitrile | 31.5 |
| MTM (Mixed tertiary $C_{12}$, $C_{14}$, $C_{16}$ mercaptan) | 0.82 |
| Dresinate 731 (Commercial Soap) | 2.0 |
| $K_2S_2O_8$ (Catalyst) | 0.3 |
| NaOH (pH control) | 0.06 |

The styrene, 2-vinylpyridine and acrylonitrile monomers were mixed in an agitator to effect a thorough mixing. The soap was mixed with a sufficient portion of the water to form a 6% soap solution. The balance of the water was charged to a glass reactor along with 15 parts of the agitated monomer mixture and 5% of the total amount of soap solution made above. The remaining monomer mixture and soap solution were fed continuously into the reaction vessel for a period of about three hours. The reaction vessel was immersed in a constant temperature bath to maintain the reaction temperature at 150° F. After all monomer and soap were charged to the reaction vessel, the vessel was maintained in the bath for one additional hour to allow the reaction to be completed. The latex was then flocculated with a 2%

$CaCl_2$ solution, filtered and dried at 160° F. until the moisture content was below 1%.

EXAMPLE 2

This example illustrates the grafting of polybutadiene and poly(butadiene-co-styrene) with two different ratios of acrylonitrile-styrene-2-vinylpyridine. The procedure described in Example 1 was used with the exception that there was no monomer mixture and soap added initially to the vessel. In each case the butadiene containing polymer was added to the vessel initially. The mixture of remaining monomers and soap was continuously fed into the reaction vessel for three hours.

| Material | Parts by weight | Parts by weight |
|---|---|---|
| Water | 140 | 140 |
| Polybutadiene | 50 | |
| Copolymer of butadiene-styrene | | 50 |
| Styrene | 33 | 28 |
| Acrylonitrile | 9 | 15 |
| 2-vinylpyridine | 8 | 8 |
| $K_2S_2O_8$ | 0.35 | 0.35 |
| Dresinate 731 | 2.0 | 2.0 |
| $Na_2CO_3$ | 0.0125 | 0.0125 |
| $NaHCO_3$ | 0.0375 | 0.0375 |

EXAMPLE 3

This example illustrates a method of making an interpolymer of acrylonitrile-butadiene-styrene-vinylpyridine having a higher vinylpyridine content than that obtained in Example 2, using a mass-bead process. The polymer had a respective ratio of monomers of (12.7/15/55.3/17). The recipe used was:

| Material | Parts by weight |
|---|---|
| Polybutadiene (Synpol 8107E) | 15.0 |
| Styrene | 55.3 |
| Acrylonitrile | 12.7 |
| 2-Vinylpyridine | 17.0 |
| Dicumyl peroxide | 0.1 |
| MTM (as per Example 1) | 0.5 |
| HV-941 antioxidant | 0.95 |
| Deionized water | 200 |
| Polyvinyl alcohol | 0.50 |

The styrene, acrylonitrile and 2-vinyl-pyridine proportions were mixed in a glass vessel and the polybutadiene was then added to the monomers and the mixture was stirred using an agitator to dissolve the rubber in the monomers. The mixture of dissolved polybutadiene and monomers along with the dicumyl peroxide and mixed tertiary mercaptan were charged into a stainless steel reactor equipped with an agitator. The vessel was purged with nitrogen and sealed. A heating mantle was placed around the external wall of the reaction vessel and was activated after the agitator was started. After one hour of reaction time the batch temperature was 195° F. and the percent solids had increased to 31.8% from the starting 22.3%. The batch was then cooled to below 150° F., the vessel opened and the antioxidant added. The vessel was then closed and the agitator used to mix the antioxidant thoroughly into the prepolymer. The vessel was then purged with nitrogen while a suspending agent, (deionized water and polyvinylalcohol) was added. The vessel was then sealed and the agitator started at 350 r.p.m. while heating was begun again. The batch was run for 16½ hours at 195° F. The reaction temperature was then raised to 270° F. and the batch run 5 additional hours. The batch was then cooled, the beads removed, filtered and washed thoroughly with water. Six hundred grams of dried product resulted.

A portion of this material was treated according to Example 5 and electrolessly plated. The total surface of the plastic was covered.

EXAMPLE 4

This example discloses a sample procedure for pretreating a thermoplastic material prior to electroless-plating, although other pretreating methods may be used if desired.

An injection molded sample (2-14" x 3-18") of plastic consisting of a blend of (74/26) styrene-acrylonitrile copolymer prepared using the procedure described in Example 1 but without the presence of vinylpyridine monomer, with a (16/50/34) ABS graft polymer prepared according to Example 1 (but without vinylpyridine and using 16 parts of acrylonitrile) was immersed in a solution of an etchant (McCulplex ABS Etchant) which is a mixture of chromic and sulfuric acid wherein the amount of $Cr^{+6}$ ion is approximately 1.40 weight percent and is supplied by chromic oxide or chromic salts such as potassium dichromate at 58.9°+.3 Be at 135° F. for 2 to 3 minutes.

The sample was then rinsed and immersed for two minutes at room temperature in a 5% activating solution (in water) having a pH between 1.7 and 2.2 of $PdCl_2$ in HCl and water with suitable buffering stabilizing and complexing agents. (The solution is known as McCulplex Activator B). The sample was again rinsed and subsequently immersed for 20 seconds at 75° F. in a 2% accelerator solution with water. This accelerator solution, which has a pH between 6.5 and 3.5 and contains sodium acid sulfate is a reducing agent and is sold under the name MaCulplex Accelerator. This solution reduces the palladium chloride on the surface of the plastic to metallic palladium. The sample was again rinsed.

The sample was immersed in a commercially available electroless metal solution known as MaCuplex Chemical Nickel containing one or more salts of nickel plus buffering, stabilizing and reducing agents.

An attempt was made to electroplate the pretreated sample using a conventional electrolytic plating method and little or no coverage resulted therefrom.

EXAMPLE 5

A sample of a polyblend ABS plastic, the resin and resinous graft constituents of which were prepared and treated using the methods described herein in Examples 1 and 4 respectively, and having the composition defined in Table 1, was treated similar to the method described in Example 4 with the exception that the activator solution was a 6% solution, the accelerator was a 2.5% solution and the chemical nickel solution was used at 150° F. at pH 5.

Table 1 compares the coverage (percent of the surface of the plastic article which is covered by the metal after electroplating) and bond strength (according to the Jacquet Test described previously) of the various experimental and control blends and also discloses the conditions under which the preplating steps were performed. The values in parenthesis after the description of the polymer indicate the respective ratios of each monomer unit contained in the polymer.

TABLE 1

| Material | Experiment | Control |
|---|---|---|
| Styrene-acrylonitrile copolymer (74/26) intrinsic viscosity (I.V.) in dimethyl formamide (DMF)=0.55 | | 65 |
| Styrene-vinylpyridine-acrylonitrile terpolymer (64.5/4/31.5) I.V. in DMF 0.57 | 65 | |
| Resinous ABS-graft polymer (16/50/34) | 35 | 35 |
| Pigments | 4.033 | 4.033 |
| Lubricant | 3.0 | 3.0 |
| Time in solutions: | | |
| Etchant (58.5 Be. at 135 F.), sec | 45 | 45 |
| Activator (at room temperature), sec | 30 | 30 |
| Accelerator (at room temperature), sec | 30 | 30 |
| Electroless nickel coverage, percent | 100 | (1) |
| Response in bond strength as tested by the Jacquet Test, lb./in | 3.0 | 0 |

[1] No coverage.

EXAMPLE 7

The following samples were treated according to the procedure outlined in Example 4 with the exceptions noted. The polymers were prepared using the methods described in either Examples 1 or 4 herein with the ratio of monomers indicated in parentheses. (Parts listed are parts by weight.)

7A

| Material | Parts | |
|---|---|---|
| | Experiment | Control |
| Styrene/acrylonitrile copolymer (72/28), parts | | 100 |
| Styrene/acrylonitirle/vinylpyridine interpolymer (64.5/31.5/4), parts | 100 | |
| Electroless nickel coverage, percent | 100 | 0 |

7B

| Material | Experiment | Control |
|---|---|---|
| Acrylonitrile/butadiene/styrene graft (16/45/39), parts | | 100 |
| Acrylonitrile/butadiene/styrene/vinylpyridine graft polymer (16/45/31/8), parts | 100 | |
| Lubricant, parts | 3 | 3 |
| Electroless nickel coverage, percent | 100 | 0 |

7C

| Material | Experiment | Control |
|---|---|---|
| Acrylonitirle/butadiene/styrene interpolymer (25/20/54.5), parts | | 100 |
| Acrylonitrile/butadiene/styrene/vinylpyridine interpolymer (22.5/20/52.5/5), parts | 100 | |
| Pigment and lubricant, parts | 4 | 4 |
| Electroless nickel coverage, percent | 100 | 75 |

The above samples were pretreated and electrolessly under the following conditions:

| Time in solutions | Parts | |
|---|---|---|
| | Experiment, min. | Control, min. |
| Etchant (135° F. at 59.5 Bé) | 3 | 3 |
| Activator (room temperature) | 3 | 3 |
| Accelerator (room temperature) | 1 | 1 |
| Electroless nickel (150° F. at pH 5) | 5 | 5 |

What we claim and desire to protect by Letters Patent is:

1. An article having enhanced electroless plateability compared with ABS, consisting essentially of a blend of:

(A) an interpolymer resin made from between about 0.25 and 25% vinylpyridine monomers, 65 and 90% styrene monomers and 5 and 35% acrylonitrile monomers, said percentages based upon the total weight of polymer, in admixture with:

(B) up to 45% of a resinous ABS polymer which is a graft polyblend of (a) styrene monomers and acrylonitrile monomers grafted onto polybutadiene or poly (butadiene-co-styrene) and (b) a copolymer made from styrene and acrylonitrile monomers.

2. The article of claim 1 wherein the interpolymer resin (A) contains about 4% vinylpyridine, about 65% styrene and 31% acrylonitrile and the resinous graft ABS polyblend consists essentially of 50% butadiene, 34% styrene and 16% acrylonitrile based upon the total weight of said graft polymer.

References Cited

UNITED STATES PATENTS

| | | | |
|---|---|---|---|
| 2,439,202 | 4/1948 | Daly | 260—85.5 X |
| 2,802,808 | 8/1957 | Hayes | 260—876 X |

FOREIGN PATENTS

| | | | |
|---|---|---|---|
| 589,755 | 12/1959 | Canada | 260—893 |

MURRAY TILLMAN, Primary Examiner

H. ROBERTS, Assistant Examiner

U.S. Cl. X.R.

117—47 A, 138.8 UA, 160 R; 260—80.72, 878 R, 880 R, 893